No. 858,407. PATENTED JULY 2, 1907.
W. MITCHELL.
UNIVERSAL GLAND ADJUSTMENT FOR STUFFING BOXES.
APPLICATION FILED MAR. 25, 1907.
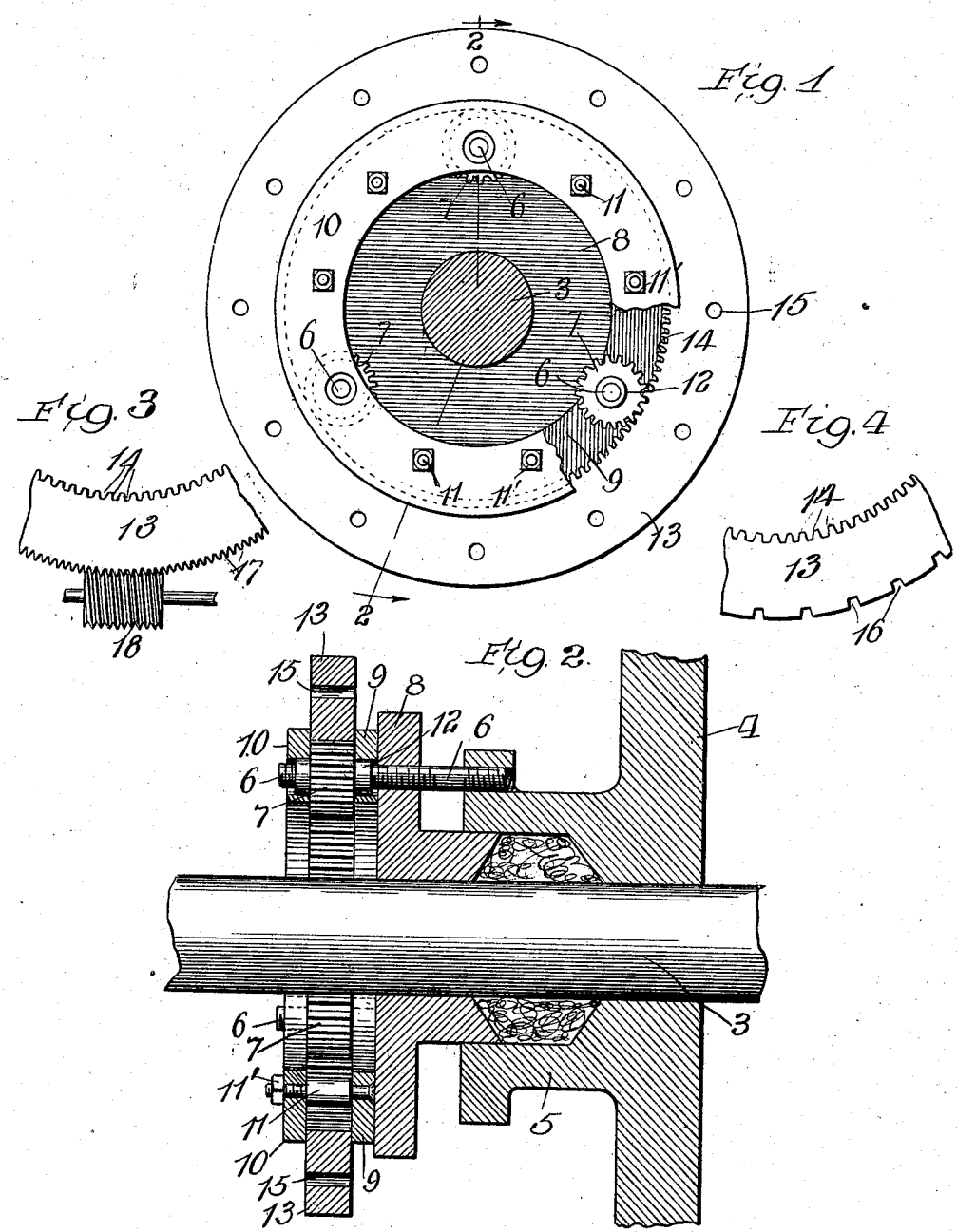

UNITED STATES PATENT OFFICE.

WILLIAM MITCHELL, OF CHICAGO, ILLINOIS.

UNIVERSAL GLAND ADJUSTMENT FOR STUFFING-BOXES.

No. 858,407.  Specification of Letters Patent.  Patented July 2, 1907.

Application filed March 26, 1907. Serial No. 364,342.

To all whom it may concern:

Be it known that I, WILLIAM MITCHELL, a citizen of the United States of America, and a resident of Chicago, Cook County, Illinois, have invented certain new and useful Improvements in Universal Gland Adjustment for Stuffing-Boxes, of which the following is a specification.

The main objects of this invention are to provide an improved form of universal adjustment for the glands of stuffing-boxes, which may be operated from any side and will simultaneously and equally adjust all of the adjusting nuts of the gland without causing excessive strain on any one part; to provide an arrangement of parts which will connect them together so that the adjusting mechanism may be handled as one part in applying it to or removing it from the stuffing box.

A further object is to provide a form of universal adjusting device which may be readily applied to old forms of stuffing boxes since it does not require a re-arrangement of the gland-adjusting studs either with respect to each other or with respect to the piston rod of the machine to which the stuffing box is applied.

While this invention is applicable to any form of stuffing box in which the gland is adjusted by means of nuts and studs, it is particularly applicable to the stuffing boxes of gas compressors or refrigerating machines, where great pressures of gas must be resisted by the packing in the stuffing box and where frequent adjustment of the gland is necessary to compensate for expansion and contraction of the packing material, or to prevent leakage of gas which would cause damage. Such stuffing boxes are usually large and it frequently happens that some of the adjusting bolts are almost inaccessible so that it is difficult to properly adjust the gland when the usual forms of stuffing boxes are employed.

These objects are accomplished by the device shown in the accompanying drawings, in which;

Figure 1 is an end elevation partly broken away of a stuffing box adjusting device constructed according to this invention. Fig. 2 is a longitudinal section of the same on the line 2—2 of Fig. 1. Fig. 3 is a fragmentary view of a modified form of adjusting ring. Fig. 4 indicates another modified form of adjusting ring, also broken away.

In the drawing, the piston rod is indicated at 3 and the cylinder head at 4. The cylinder head is provided with the usual stuffing box 5, having rigidly mounted thereon an annular series of stud bolts 6 which are disposed in parallel relation to each other and to the piston rod 3. The studs 6 are preferably equally spaced. The gland is provided with the usual flange 8 having apertures therein through which the studs 6 extend. The studs 6 are threaded and a nut 7 is mounted on each. Each of these nuts is in the form of a pinion having gear teeth on its periphery.

The nuts 7 are loosely secured between a pair of annular plates or rings 9 and 10 which secure them in the same plane with each other. The plates 9 and 10 are rigidly connected by means of a plurality of studs 11 which extend transversely between said plates and are shouldered so as to space said plates apart to loosely fit the nuts 7. The studs 11 are preferably riveted to the plate 9 and are reduced in diameter where they extend through the plate 10, the reduced ends being threaded and provided with nuts 11'. The nuts 7 are preferably provided with hubs 12 journaled in the plates 9 and 10 so that the nuts will be retained in position between the plates and in proper relation to each other when the adjusting device is removed from the studs. An adjusting member in the form of a ring 13 is loosely confined between the plates 9 and 10 and extends around the outside of the series of nuts 7. The ring 13 is provided with an inner annular series of gear teeth 14 which mesh with the gear teeth on the nuts 7. The ring 13 is also provided with an annular series of spanner holes or recesses 15 which permit of rotating said ring by means of a suitable tool. If desired these spanner recesses may be made in the form of peripheral indentations, as indicated at 16 in Fig. 4 or the ring 13 might be provided with teeth 17 on its outer periphery, as in Fig. 3 and be driven by a worm 18.

The operation of the device shown is as follows; If the stud bolts 6 are provided with righthand threads then the rotation of the ring 13 in a righthanded direction will adjust the gland inward and a lefthand rotation will ease back the gland. When the ring 13 is turned an equal strain is exerted upon each of the studs and upon the teeth of each pinion. In case it is desired to re-pack the stuffing box, the nuts 7 and their adjusting mechanism may be removed from the studs as one member.

If, for the purpose of cleaning or repairing the adjusting mechanism, it is desired to remove the pinion 7, the plates 9 and 10 may be readily separated by removing the nuts 11'.

What I claim as my invention and desire to secure by Letters Patent, is;

1. A stuffing box adjustment, comprising an annular series of bolts, gland adjusting nuts on said bolts having gear teeth on their peripheries, an adjusting member having an internal annular series of teeth meshing with the teeth on all of said nuts, and means for preventing said member from shifting out of engagement with said nuts.

2. The combination with a stuffing box and its gland, of an annular series of bolts extending between said box and gland, gland-adjusting nuts on said bolts having gear teeth on their peripheries, a member having thereon an annular series of teeth meshing with the teeth on said nuts, and means other than said nuts for rotating said member and thereby causing said nuts to simultaneously rotate through equal angular distances.

3. The combination with a stuffing box and its gland, of an annular series of bolts extending between said box and gland, gland-adjusting nuts having threaded engagement with said bolts and having gear teeth on their peripheries, and an annular member mounted to rotate concentrically of said annular series of bolts and having gear teeth meshing with the teeth on each of said nuts, said member having therein an annular series of spanner holes whereby said member may be rotated for simultaneously causing an equal angular movement of each of said nuts.

4. The combination with a stuffing box and its gland, of an annular series of parallel bolts extending between said stuffing box and gland, gland adjusting nuts on said bolts having threaded engagement therewith and having gear teeth on their peripheries, a ring interposed between the gland and said nuts, a member rotatably mounted on said ring outside of said nuts and having thereon an internal annular series of gear teeth meshing with the teeth on said nuts, and means for preventing said member from shifting out of engagement with said nuts.

5. The combination of a stuffing box having a flanged gland, a plurality of bolts rigidly mounted on said box, being arranged concentrically thereof and extending through the flange of said gland, gland-adjusting nuts mounted on said bolts and having threaded engagement therewith and having toothed peripheries, a pair of plates fitting against opposite sides of said nuts and adapted to loosely secure the same in the same plane with each other, and an adjusting member extending around outside of said nuts, being loosely mounted between said plates and having thereon an annular series of teeth meshing with the teeth on said nuts.

6. The combination of a stuffing box having a flanged gland, a plurality of bolts rigidly mounted on said box, being arranged concentrically thereof and extending through the flange of said gland, gland-adjusting nuts mounted on said bolts and having threaded engagement therewith and having toothed peripheries, a pair of plates fitting against opposite sides of said nuts and adapted to loosely secure the same in the same plane with each other, means rigidly connecting said plates with each other, and an adjusting member extending around outside of said nuts, being loosely mounted between said plates and having thereon an annular series of teeth meshing with the teeth on said nuts.

7. The combination of a stuffing box having a flanged gland, a plurality of bolts rigidly mounted on said box, being arranged concentrically thereof, and extending through the flange of said gland, gland-adjusting nuts mounted on said bolts and having threaded engagement therewith and having toothed peripheries, a pair of plates fitting against opposite sides of said nuts and adapted to loosely secure the same in the same plane with each other, a plurality of studs connecting said plates and having thereon shoulders adapted to space said plates apart to loosely confine said nuts, and an adjusting member extending around outside of said nuts, being loosely mounted between said plates and having thereon an annular series of teeth meshing with the teeth on said nuts.

8. The combination of a stuffing box having a flanged gland, a plurality of bolts rigidly mounted on said box, being arranged concentrically thereof and extending through the flange of said gland, gland-adjusting nuts mounted on said bolts and having threaded engagement therewith and having toothed peripheries, a pair of plates fitting against opposite sides of said nuts and adapted to loosely secure the same in the same plane with each other, a plurality of studs connecting said plates and having thereon shoulders adapted to space said plates to loosely confine said nuts, said studs being removably connected with one of said plates, and an adjusting member extending around outside of said nuts, being loosely mounted between said plates and having thereon an annular series of teeth meshing with the teeth on said nuts.

9. The combination of a stuffing box having a flanged gland, a plurality of bolts arranged in parallel relation to each other, being rigidly secured to said stuffing box and extending through the flange of said gland, gland-adjusting nuts on each of said bolts, a pair of plates spaced apart to receive said nuts and secure the same in the same plane with each other, a series of studs rigidly connecting said plates with each other, and an annular member mounted between said plates outside of said nuts and having thereon an internal annular series of gear teeth meshing with the teeth on said nuts, and means for rotating said member.

10. The combination of a stuffing box having a flanged gland, a plurality of bolts arranged in parallel relation to each other, being rigidly secured to said stuffing box and extending through the flange of said gland, gland-adjusting nuts on each of said bolts, a pair of plates spaced apart to receive said nuts and secure the same in the same plane with each other, a series of studs rigidly connecting said plates with each other, and an annular member mounted between said plates outside of said nuts and having thereon an internal annular series of gear teeth meshing with the teeth on said nuts, said member having therein an annular series of recesses adapted to be engaged by a spanner wrench for rotating it.

11. The combination of a stuffing box having a flanged gland, a plurality of bolts rigidly mounted on said box, being arranged concentrically thereof and extending through the flange of said gland, gland-adjusting nuts mounted on said bolts and having threaded engagement therewith and having toothed peripheries, a pair of plates fitting against opposite sides of said nuts and adapted to loosely secure the same in the same plane with each other, an adjusting member extending around outside of said nuts, being loosely mounted between said plates and having thereon an annular series of teeth meshing with the teeth on said nuts, hubs on said nuts journaled in said rings and adapted to retain the nuts in proper relation when removed from said bolts.

Signed at Chicago this 22nd day of March 1907.

WILLIAM MITCHELL.

Witnesses:
E. A. RUMMLER,
CHAS. W. ELMES.